United States Patent
Nikitin et al.

(10) Patent No.: US 7,952,464 B2
(45) Date of Patent: May 31, 2011

(54) CONFIGURABLE RFID TAG WITH PROTOCOL AND BAND SELECTION

(75) Inventors: Pavel Nikitin, Seattle, WA (US);
Venkata Kodukula, Bothell, WA (US);
For Sander Lam, Bothell, WA (US)

(73) Assignee: Intermec IP Corp., Everett, WA (US)

( * ) Notice: Subject to any disclaimer, the term of this patent is extended or adjusted under 35 U.S.C. 154(b) by 811 days.

(21) Appl. No.: 11/545,020

(22) Filed: Oct. 5, 2006

(65) Prior Publication Data

US 2008/0084310 A1    Apr. 10, 2008

(51) Int. Cl.
*H04Q 5/22* (2006.01)
(52) U.S. Cl. .............. 340/10.1; 340/572.1; 340/10.33; 340/10.2; 455/275
(58) Field of Classification Search .......... 340/10.1, 340/572.1, 10.2, 10.33; 455/275
See application file for complete search history.

(56) References Cited

U.S. PATENT DOCUMENTS

| | | | |
|---|---|---|---|
| 6,023,610 A * | 2/2000 | Wood, Jr. ................ 455/101 |
| 6,147,605 A | 11/2000 | Vega et al. |
| 6,265,977 B1 | 7/2001 | Vega et al. |
| 6,617,962 B1 * | 9/2003 | Horwitz et al. ............ 340/10.4 |
| 6,732,923 B2 | 5/2004 | Otto |
| 7,084,823 B2 * | 8/2006 | Caimi et al. .............. 343/742 |
| 7,132,946 B2 * | 11/2006 | Waldner et al. ............ 340/572.1 |
| 7,193,565 B2 * | 3/2007 | Caimi et al. ............ 343/700 MS |
| 7,196,613 B2 * | 3/2007 | Horwitz et al. ............ 340/10.1 |
| 7,248,165 B2 * | 7/2007 | Collins et al. ............ 340/572.1 |
| 7,375,616 B2 * | 5/2008 | Rowse et al. ............ 340/10.1 |
| 7,495,559 B2 * | 2/2009 | Nagai et al. ............ 340/572.1 |
| 7,528,728 B2 * | 5/2009 | Oliver et al. ............ 340/572.8 |
| 2004/0075613 A1 * | 4/2004 | Jarmuszewski et al. ...... 343/702 |
| 2004/0203478 A1 * | 10/2004 | Scott .............................. 455/70 |
| 2004/0263319 A1 * | 12/2004 | Huomo ....................... 340/10.2 |
| 2005/0052283 A1 * | 3/2005 | Collins et al. ............ 340/572.7 |
| 2005/0231331 A1 | 10/2005 | Kang |
| 2005/0237198 A1 * | 10/2005 | Waldner et al. ............ 340/572.7 |
| 2006/0065730 A1 * | 3/2006 | Quan et al. ................. 235/451 |
| 2006/0229050 A1 * | 10/2006 | Maurer ........................ 455/275 |
| 2006/0240785 A1 * | 10/2006 | Fischer .......................... 455/78 |
| 2006/0250252 A1 * | 11/2006 | Nagai et al. ............ 340/572.7 |
| 2007/0057797 A1 * | 3/2007 | Waldner et al. ............ 340/572.7 |
| 2007/0273527 A1 * | 11/2007 | Yamagajo et al. ......... 340/572.7 |
| 2008/0061943 A1 * | 3/2008 | Wu et al. .................... 340/10.33 |
| 2008/0084310 A1 * | 4/2008 | Nikitin et al. ............. 340/572.7 |
| 2008/0122631 A1 * | 5/2008 | Kodukula et al. .......... 340/572.8 |
| 2008/0238789 A1 * | 10/2008 | Wilcox ........................ 343/750 |

OTHER PUBLICATIONS

"Guide to RFID Tag Selection," The Intermec®—Intermec Expect More, copyright 2004, 8 pages.
"UHF Large Rigid Tag," Intermec Product Profile, copyright 2006, 2 pages.

* cited by examiner

*Primary Examiner* — George A Bugg
*Assistant Examiner* — Bradley E Thompson
(74) *Attorney, Agent, or Firm* — Perkins Coie LLP

(57) ABSTRACT

A multi-band and/or multi-protocol, configurable, RFID tag is provided. The tag can include one or more electrical or mechanical selectors for selecting from among multiple frequency bands and communication protocols. In some embodiments, a signal band and protocol can be detected automatically and selection among bands and protocols can be performed automatically. In some embodiments, one or more externally accessibly switches can be actuated by a user to select a band and/or protocol.

21 Claims, 5 Drawing Sheets

Figure 1 – Reconfigurable RFID tag.

US 7,952,464 B2

CONFIGURABLE RFID TAG WITH PROTOCOL AND BAND SELECTION

BACKGROUND

In the automatic data identification industry, the use of RF transponders (also known as RF tags) has grown in prominence as a way to track data regarding an object on which an RF transponder is affixed. An RF transponder generally includes a semiconductor memory in which information may be stored. An RF interrogator containing a transmitter-receiver unit is used to query (or interrogate) an RF transponder that may be at a distance from the interrogator. The RF transponder detects the interrogating signal and transmits a response signal containing encoded data back to the interrogator. RF and RFID systems are used in applications such as inventory management, security access, personnel identification, factory automation, automotive toll debiting, and vehicle identification.

Such RFID systems can provide certain advantages over conventional optical indicia recognition systems (e.g., bar code symbols). For example, the RF transponders may have a memory capacity of several kilobytes or more, which is substantially greater than the maximum amount of data that may be contained in a conventional one-dimensional bar code symbol. The RF transponder memory may be re-written with new or additional data, which would not be possible with a printed bar code symbol. Moreover, RF transponders may be readable at a distance without requiring a direct line-of-sight view by the interrogator, unlike bar code symbols that must be within a direct line-of-sight and which may be entirely unreadable if the symbol is obscured or damaged. An additional advantage of RFID systems is that several RF transponders can be read by the interrogator at one time.

Existing RFID tags can operate in any one of several different frequency bands. Ultra High Frequency (UHF) tags operate around 900 MHz, high frequency tags operate around 13.56 MHz, and low frequency tags operate around 125/134 kHz. Depending on the application and environment, certain frequency bands may be preferred. It is generally accepted that no single frequency is the optimal frequency for all applications. To communicate with a given tag in the field, a tag reader must be able to communicate at a frequency shared with the tag.

Existing RFID tags can also operate according to any one of several different established protocols. Existing protocols can include EPC Class 0, EPC Class 1, EPC Gen 2, ISO/IEC 14443, and ISO/IEC 7816. These protocols are not necessarily interoperable. Thus, a reader capable of reading only one protocol may not be able to read a tag capable only of communicating using another protocol. To communicate with a given tag, a tag reader must be able to communicate using a protocol shared with the tag.

DETAILED DESCRIPTION

In a broad sense, a configurable communications device and a method for configuring a portable communications device are disclosed in detail below.

The configurable tag described herein can be configured to be used anywhere, at any frequency, and according to any RFID protocol or standard. As non-limiting examples, the tag could be operated at or about 900 MHz, 13.56 MHz, or 125/134 kHz and according to EPC Class 0, EPC Class 1, EPC Gen 2, ISO/IEC 14443, or ISO/IEC 781 protocols. The tag can be compatible with any new and/or legacy RFID system and can be resuable. The tag can consist of one or more selectors, RFID ASIC processors, discrete RF matching components, and one or more antennas, and be applicable to any type of tag, such as passive or active tags. Indeed, aspects of the invention can be used in any wireless data collection environment employing multiple wireless air interface protocols for receiving or exchanging information, and thus the term "tag" as used herein is intended to cover all such devices unless otherwise specifically indicated.

Figure 1:
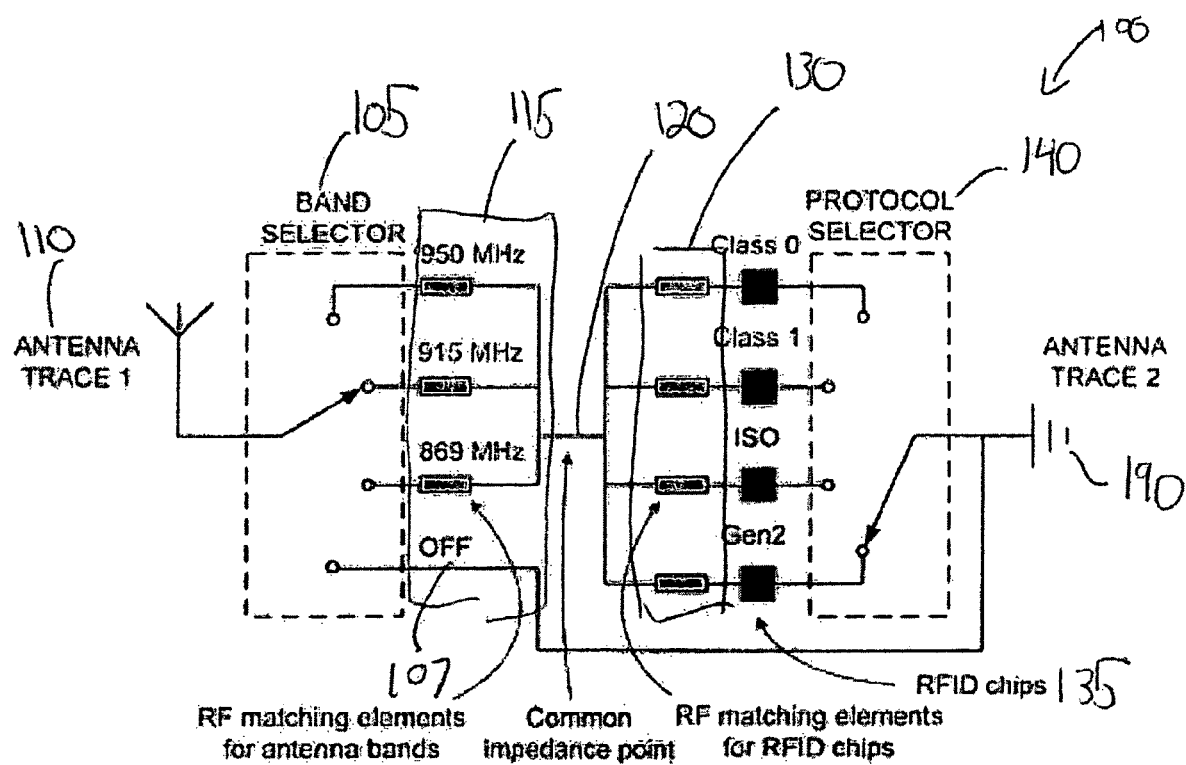
FIG. 1 illustrates an exemplary configurable RFID tag.

The configurable RFID tag can be arranged as illustrated in FIG. 1. Tag 100 of FIG. 1 includes a first antenna trace 110 coupled to a band selector 105. Antenna trace 110 can be any antenna suitable for operation at the desired frequencies. Antenna trace 110 can be a shared RFID tag antenna which can be a dipole, patch, slot, or any other type of antenna suitable for operation at a selected frequency or range of frequencies. Antenna trace 110 can be matched to any standard impedance, e.g. 50 Ohms, to the average of processor or chip impedances, or to another value. In some embodiments, antenna trace 110 can include more than one antenna.

The band selector 105 connects antenna trace 110 to one of multiple RF matching elements 115. In some embodiments, the band selector can be a switch. The selector can be operated electrically, mechanically, or by a combination of electrical and mechanical actions. As non-limiting examples, the selector can be a toggle switch, rocker switch, a pushbutton switch, tact switch, DIP switch, snap-action switch, slide switch, rotary switch, keylock switch, leaf switch or detector switch. The selectors can also be electrically operated gates, such as transistors.

Band selector 105 can be used to select an OFF position 107. When OFF position 107 is selected, antenna trace 110 is not coupled to a matching element and no signal is received at any of multiple RFID processors 135. In the embodiment illustrated in FIG. 1, selecting the OFF position 107 couples antenna trace 110 to antenna trace 190. The OFF position can allow a user to temporarily switch the tag off completely (e.g. for security purposes).

RF matching elements 115 can include multiple elements selected for operating at certain frequencies. To match electrical impedances, RF matching elements 115 can include any combination of transformers, resistors, inductors and/or capacitors. These impedance matching devices can be optimized for different applications, as described below. RF matching elements 115 can include one or more antenna tuners or other structures or devices for transforming impedance. In the example illustrated in FIG. 1, RF matching elements 115 are tuned for 950 MHz, 915 MHz, and 869 MHz. In some embodiments, RF matching elements 115 can be planar inductor traces printed together with the antenna on the same substrate. By selecting RF matching elements, the tag may be optimized for a particular frequency and thus effectively have an optimized read range.

RF matching elements 115 can be coupled to common impedance point 120. In some embodiments, common impedance point 120 is a node that couples RF matching elements 107 to RF matching elements 130. In other embodiments, individual RF matching elements 115 can be coupled to individual RF matching elements 130 without common impedance point 120.

RF matching elements 130 couple common impedance point 120 to RFID processors 135. To match electrical impedances, RF matching elements 130 can include any combination of transformers, resistors, inductors and/or capacitors. In some embodiments, RF matching elements 130 can be planar inductor traces printed together with the RF matching elements 115 on the same substrate.

RFID processors 135 can include individual processors capable of operating according to any standardized or non-standard protocol. As non-limiting examples, RFID processors 135 can include processors for operating according to EPC Class 0, EPC Class 1, EPC Gen 2, ISO/IEC 14443, or ISO/IEC 781 protocols. In the depicted embodiment, each protocol is implemented using a discrete RFID processor. In other embodiments, a single RFID processor can communicate according to more than one protocol. Thus, while multiple processors are shown, alternative embodiments may employ a single processor. The processors can employ any form of appropriate circuitry, such as microprocessors, microcontrollers, application specific integrated circuits (ASICs), field programmable gate arrays (FPGAs), etc., or combinations thereof. In some embodiments, multiple RFID processors can be used to communicate according to the same protocol, which could help, for example, by providing redundancy or for manufacturing fault tolerance. The one or more RFID processors 135 can include memory for storing data on the tag; alternatively or additionally, a separate memory device or chip can be provided on the tag and be coupled to the processor(s).

Protocol selector 140 couples a selected RFID processor configured to operate according to a certain protocol from among RFID processors 135 to antenna trace 190. Protocol selector 140, like band selector 105, can be operated electrically, mechanically, or by a combination of electrical and mechanical actions and can be embodied as any type of electrical or mechanical switch. In some embodiments, the selectors used in protocol selector 140 and band selector 105 can be completely sealed and made weatherproof using known techniques and components.

Figure 2:
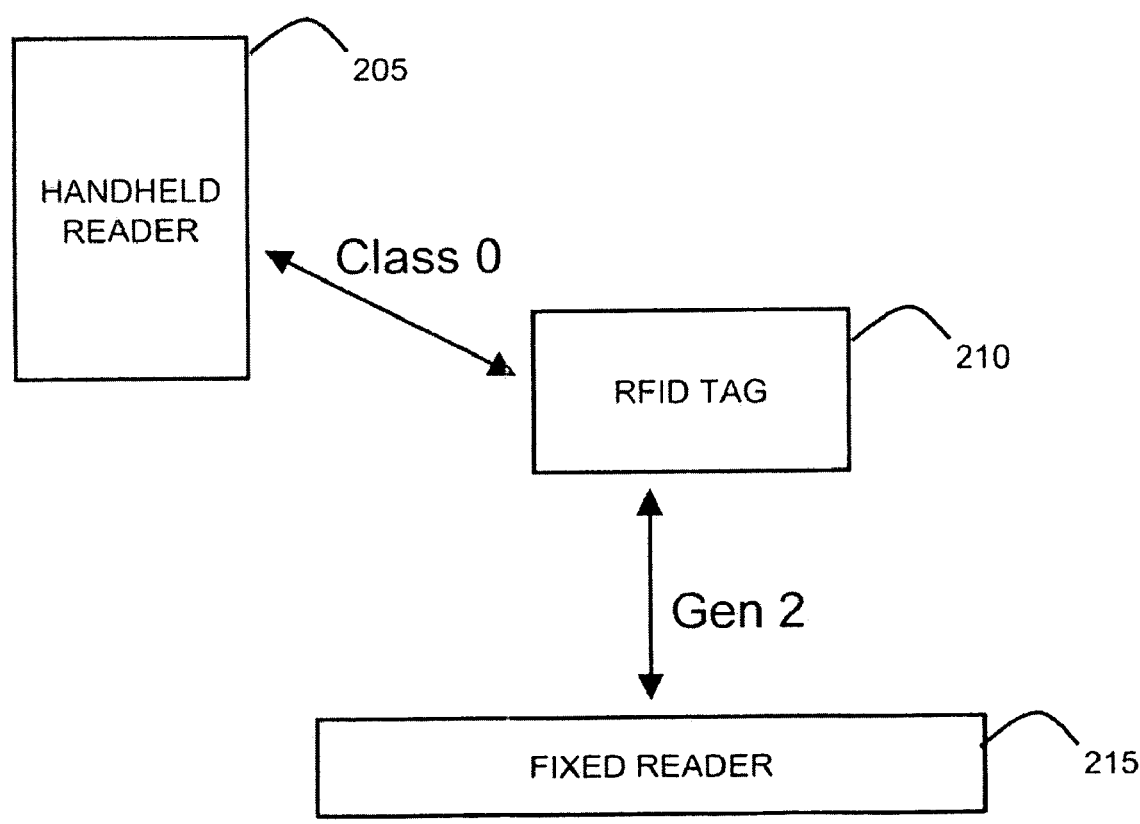
FIG. 2 illustrates an exemplary use of an RFID tag with multiple protocols in a supply chain.

The protocol selector may be used, for example, in a long supply chain where a tag may move from an infrastructure that is based on the Class 0 protocol to an infrastructure based on Gen 2. As illustrated in FIG. 2, at one point in a supply chain, an RFID tag 210 may be present in an environment in which the Class 0 protocol is used. In the example, a handheld reader 205 is used to interrogate tag 210 using the Class 0 protocol. At a later point in the supply chain, the RFID tag 210 may be present in an environment in which the Gen 2 protocol is used. At this point, a fixed reader 215 is used to interrogate the same tag 210 using the Gen 2 protocol. In such a supply chain, a single tag may be used even though different portions of the chain employ different protocols.

Figure 3:
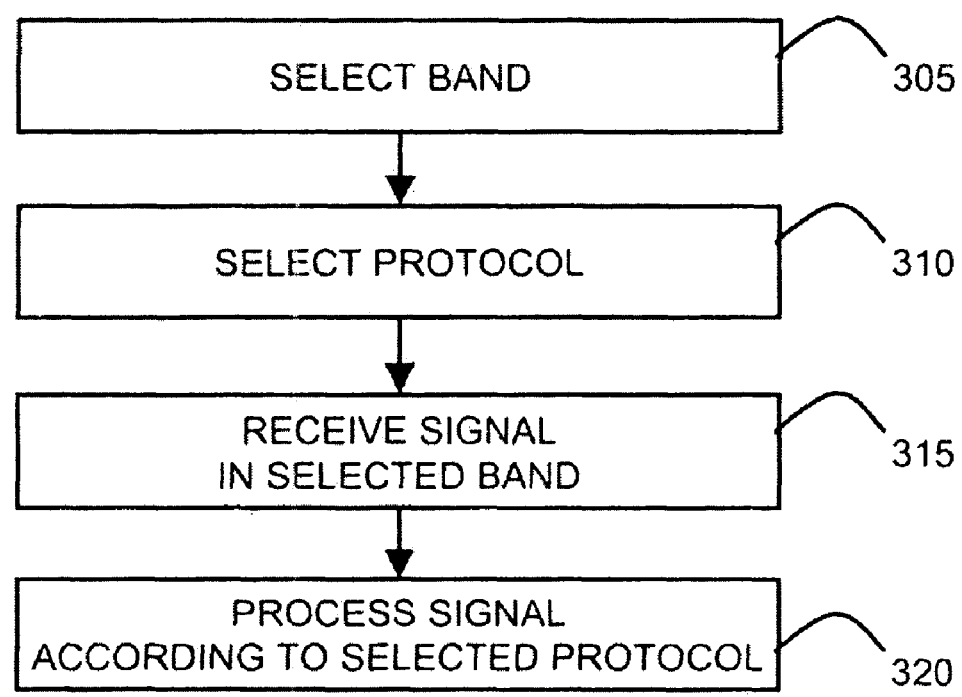
FIG. 3 illustrates an exemplary method for manually configuring an RFID tag.

A method for manually configuring an RFID tag is illustrated in FIG. 3. A user can actuate a selector on a tag to select a band 305 and select a protocol 310. Once the band and protocol are selected, a signal can be received in the selected band 315 and the signal processed according to the selected protocol 320. While FIG. 3 illustrates selection of a band before selection of a protocol, in other embodiments, the protocol could be selected before the band or at the same time as the protocol. In some embodiments, the protocol can be selected automatically while the band is selected manually or the band can be selected automatically while the protocol is selected manually. In some embodiments, either the protocol or the band can be permanently set at the time of tag manufacture.

In some embodiments, the protocol or band selection could be permanently effected. For example, scratch off traces, programmable fuses, anti-fuses, or other physical or electrical configurations may be used to permanently select a protocol, band, or both.

In some embodiments, the band selector 105 and/or protocol selector 140 can be operated automatically. Band selector 105 can include circuitry for detecting the band of a received signal and automatically selecting the corresponding RF matching element from the multiple RF matching elements 115. In some embodiments, protocol selector 140 can include circuitry for detecting the protocol of the received signal and automatically selecting the corresponding RF matching element from the multiple RF matching elements 130. The circuitry for detecting band and protocol can be located in the band selector 105 or protocol selector 140, respectively, or elsewhere in the tag.

In some embodiments, the tag itself can be adapted to interpret an incoming signal and intelligently select an antenna and/or band configuration and/or appropriate protocol. For example, the tag can include a wideband receiver for receiving a command from a reader. The command from the reader can instruct the tag to receive signals in a specified frequency band by, for example, selecting a certain RF matching element, tuning one or more antennas, or otherwise optimizing the tag for operation at a certain frequency or range of frequencies. In some embodiments, the tag can receive an RFID signal transmitted by a reader using a known frequency band and then switch to operation on another band based on a command from the reader. Similarly, in some embodiments, the tag can receive an RFID signal transmitted by a reader using a known protocol band and then switch to operation according to another protocol based on a command from the reader. Referring to the example illustrated in FIG. 2, handheld reader 205 could transmit a command to RFID tag 210 to switch to the Gen 2 protocol so that it will be readable by the Gen 2 fixed reader 215 at a later time.

In some embodiments, the band selector 105 and/or protocol selector 140 can be software switches implemented wholly or partly in code and actuated by a processor executing the code. A tag reader or other device could be used to cause the tag to perform a switch. In some embodiments, electrically operated selectors can be remotely activated by an RF signal. For example, a reader may be configured to read a tag and instruct it to reconfigure itself to a specified band and/or protocol in a manner similar to that of an EPROM or field programmable gate array (although the reader may be required to provide greater power output to electrically reconfigure certain circuit elements in a tag).

Antenna trace 190 can be any antenna suitable for operation at the desired frequencies. Antenna trace 190 can be a shared RFID tag antenna which can be of dipole, patch, slot, or any other type. Antenna trace 190 can be matched to a standard impedance, e.g. 50 Ohms, to the average of processor impedances, or to another value. The tag antenna traces 110 and 190 and matching elements can be selected and designed to give a specified read range performance for any individual RFID protocol/band combination. As discussed above, the tag can also be constructed to use more than one antenna and operate at any other (lower or higher) RFID frequency band.

Figure 4:
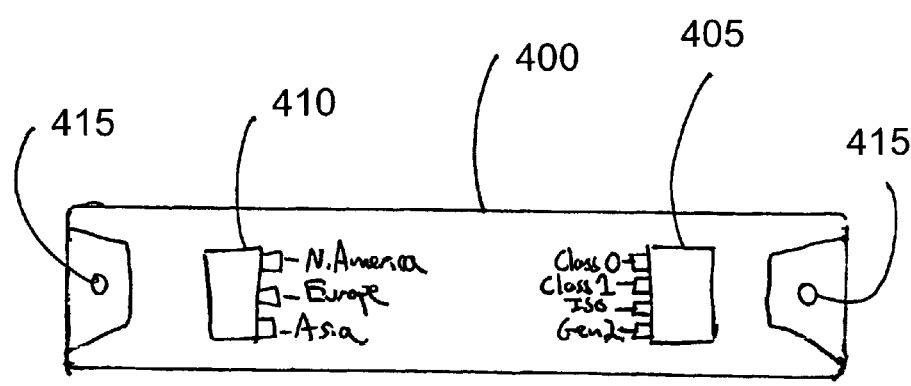
FIG. 4 illustrates an exemplary rigid mount for a configurable RFID tag.

The tag can be embodied as a rigid tag or as a flexible tag. One example of a configurable tag is illustrated in FIG. 4. The tag illustrated in FIG. 4 includes a rigid metal mount tag body 400, a protocol selector switch 405 for selecting a protocol, and a band selector switch 410 for selecting among frequency bands used in America, Europe and Asia. The tag can also include holes 415 in the tag body 400 for mounting purposes. In some embodiments in which protocol and/or band selection is performed automatically, one or both of protocol selector switch 405 and a band selector switch 410 may not be mounted on the exterior of the tag.

Figure 5:
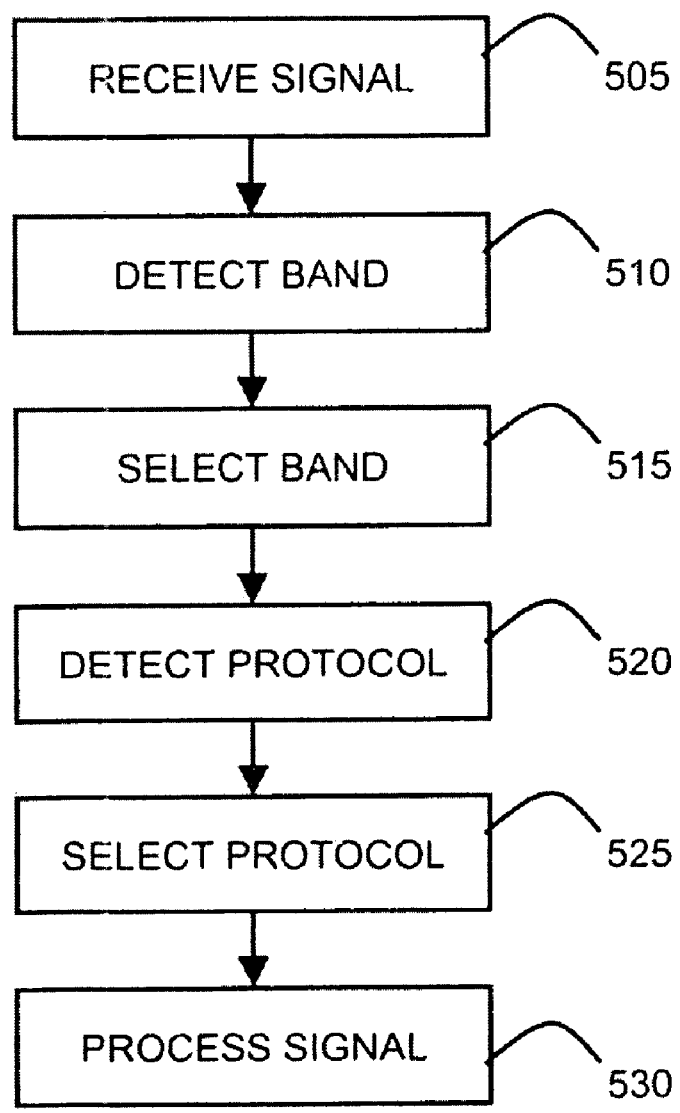
FIG. 5 illustrates an exemplary method for automatically configuring an RFID tag.

One method for automatically configuring an RFID tag is illustrated in FIG. 5. The tag first receives an initial or energizing signal 505, such as from an RFID reader (not shown). The tag can then automatically detect the frequency band of the received signal 510, such as from information encoded in the signal. Once the band has been detected, the band is selected 515. In some embodiments, the band is selected by actuating a selector or automatically via a software switch to couple an appropriate RF matching element as discussed above. After band selection, the protocol can be detected 520, which again may be determined from information encoded in the received signal. Once the protocol is detected, the protocol is selected 525. In some embodiments, the protocol is selected by actuating a selector or automatically via a software switch to couple an appropriate RF matching element as discussed above. After the protocol is selected, the signal can be processed according to the protocol 530. In the embodiment illustrated in FIG. 5, the band is selected before the protocol is selected, but in other embodiments, the protocol can be selected before the band is selected or in parallel with band selection.

The tag described herein can be used for any product application for which an RFID tag can be used. The tag can be configured to operate in any country, at any frequency band, and with any RFID standard. While the description above is made with reference to selecting among multiple bands and protocols, additional circuitry in the tag can be selected using manual or automatic switching, such as different antennas and other components or parts.

RFID tags are typically constructed for specific applications (e.g., for mounting on metal, to be flexible, to have a certain size, etc.). When not used in the intended manner, the tags may suffer decreased performance. The configurable tag described herein can be used in different environments such that, for example, a tag intended for mounting on metal would automatically tune itself for use in applications when it was not mounted on a metal substrate. Certain RF matching elements may be known to be well matched for use with certain materials such as metal, wood, liquids, or plastic, and thus the matching elements 115 may be chosen to provide improved or optimal responsiveness for these or other materials. Thus, a selector on the tag can be used to automatically or manually tune the tag so that it can be placed in, on, or near different materials. An automatic or manual materials selector can be provided on a tag in addition to or instead of protocol and band selectors.

Many specific details of certain embodiments of the invention are set forth in the description and in FIGS. 1-5 to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the invention. As used herein, one or more components "coupled" to each other can be coupled directly (i.e., no other components are between the coupled components) or indirectly (i.e., one or more other components can be placed between the coupled components).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined or altered to provide further embodiments. For example, while a multi-band, multi-protocol, configurable, RFID tag is shown, alternative embodiments may include tags that are only multi-band configurable or multi-protocol configurable.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein.

The terminology used in the Detailed Description is intended to be interpreted in its broadest reasonable manner, even though it is being used in conjunction with a detailed description of certain specific embodiments of the invention. Certain terms may even be emphasized; however, any terminology intended to be interpreted in any restricted manner will be overtly and specifically defined as such in this Detailed Description section. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as a means-plus-function claim under 35 U.S.C §112, other aspects may likewise be embodied as a means-plus-function claim. Accordingly, the inventors reserve the right to add additional claims after filing the application to pursue such additional claim forms for other aspects of the invention.

We claim:

1. A configurable radio frequency identification (RFID) tag, comprising:
   an antenna for receiving an RFID signal;
   multiple RF matching elements for operating at multiple frequency bands;
   a band selector coupled to the antenna for selecting one of the RF matching elements;
   a protocol selector for selecting a protocol;
   a material selector for selectively tuning the RFID tag to a selected material based on an electrical or manual input from a user, wherein the selected material is a material on which the RFID tag is placed in, on, or near; and,
   an RFID processor for processing the signal according to the selected protocol,
   wherein the band selector and protocol selector each comprises an array of manually controlled switches.

2. The tag of claim 1, wherein the RFID processor is configured to communicate according to multiple protocols.

3. The tag of claim 1, further comprising multiple RFID processors coupled to the multiple RF matching elements, wherein the protocol selector is coupled to another antenna and to the multiple RFID processors for selecting one of the RFID processors, and wherein each of the multiple RFID processors is configured to operate according to a different protocol.

4. The tag of claim 1, further comprising multiple RFID processors coupled to the multiple RF matching elements and wherein the protocol selector is coupled to another antenna and to the multiple RFID processors for selecting one of the RFID processors.

5. The tag of claim 1, wherein the tag is enclosed in a rigid body.

6. The tag of claim 1, further comprising a common impedance point for coupling the multiple RF matching elements to the RFID processor.

7. The tag of claim 1, wherein the band selector further comprises a circuit element for decoupling the antenna from the RF matching elements in an OFF position.

8. The tag of claim 1, wherein the multiple RF matching elements further comprise one or more resistors, inductors and/or capacitors.

9. The tag of claim 1, wherein the tag can be reconfigured to operate at a different band or according to a different protocol.

10. A configurable radio frequency identification (RFID) tag, comprising:
    an antenna for receiving an RFID signal;
    multiple RF matching elements for operating at multiple frequency bands;
    a band selector coupled to the antenna for selecting one of the RF matching elements;
    a protocol selector for selecting a protocol;
    a material selector for selectively tuning the RFID tag to a selected material based on an electrical or manual input from a user, wherein the selected material is a material on which the RFID tag is placed in, on, or near; and,
    an RFID processor for processing the signal according to the selected protocol.

11. The tag of claim 10, wherein the RFID processor is configured to communicate according to multiple protocols.

12. The tag of claim 10, further comprising a protocol detector for detecting a protocol of the received signal and wherein the protocol selector selects a protocol automatically based on a detected protocol.

13. The tag of claim 10, further comprising multiple RFID processors coupled to the multiple RF matching elements, wherein the protocol selector is coupled to another antenna and to the multiple RFID processors for selecting one of the RFID processors, and wherein each of the multiple RFID processors is configured to operate according to a different protocol.

14. The tag of claim 10, further comprising multiple RFID processors coupled to the multiple RF matching elements and wherein the protocol selector is coupled to another antenna and to the multiple RFID processors for selecting one of the RFID processors.

15. The tag of claim 10, wherein the band selector is an electrically operated switch.

16. The tag of claim 10, wherein the band selector is a mechanically operated switch.

17. The tag of claim 10, wherein the band selector further comprises a circuit element for decoupling the antenna from the RF matching elements in an OFF position.

18. The tag of claim 10, wherein the multiple RE matching elements further comprise one or more resistors, inductors and/or capacitors.

19. The tag of claim 10, wherein the tag can be reconfigured to operate at a different band or according to a different protocol.

20. The tag of claim 10, further comprising a band detector for detecting a band of the received signal and wherein the band selector selects one of the RF matching elements automatically based on the detected band.

21. An apparatus for use with a radio frequency identification (RFID) tag, wherein the tag includes an RFID processor, and includes an antenna for receiving an RFID signal, the apparatus comprising:
    multiple RF matching elements for operating at multiple frequency bands;
    a band selector coupled to the antenna for selecting one of the RF matching elements;
    a protocol selector for selecting a protocol; and,
    a material selector for selectively tuning the RFID tag to a selected material based on an electrical or manual input from a user, wherein the selected material is a material on which the RFID tag is placed in, on, or near; and,
    wherein the RFID processor is configured to process the signal according to the selected protocol.

* * * * *